United States Patent
Kihara et al.

[11] Patent Number: 5,901,288
[45] Date of Patent: May 4, 1999

[54] NETWORK OPERATING INFORMATION SYSTEM HAVING DESIGN DEVICE AND AUTOMATIC SETTING DEVICE

[75] Inventors: Kenichi Kihara, Fujisawa; Satoru Tezuka; Shigeru Miyake, both of Yokohama; Yoichiro Sakurai, Ebina; Junji Inaba, Hiratsuka, all of Japan

[73] Assignee: Hitachi, Ltd., Tokyo, Japan

[21] Appl. No.: 08/761,370

[22] Filed: Dec. 9, 1996

[30] Foreign Application Priority Data

Dec. 15, 1995 [JP] Japan ................................... 7-326811

[51] Int. Cl.⁶ .................................................. G06F 13/14
[52] U.S. Cl. ............................... 395/200.53; 395/200.43; 395/200.47; 395/200.5; 395/200.51; 395/200.52; 395/200.8
[58] Field of Search ............................ 395/200.5, 200.51, 395/200.52, 200.53, 200.8, 200.43, 200.47

[56] References Cited

U.S. PATENT DOCUMENTS

| | | | |
|---|---|---|---|
| 5,021,949 | 6/1991 | Morten et al. | 395/200.61 |
| 5,142,680 | 8/1992 | Ottman et al. | 395/712 |
| 5,155,847 | 10/1992 | Kironac et al. | 395/200.51 |
| 5,208,912 | 5/1993 | Nakayama et al. | 395/200.33 |
| 5,247,683 | 9/1993 | Holmes et al. | 395/200.51 |
| 5,280,627 | 1/1994 | Flaherty et al. | 395/652 |
| 5,353,432 | 10/1994 | Richebe et al. | 395/500 |
| 5,367,686 | 11/1994 | Fisher et al. | 395/652 |
| 5,381,534 | 1/1995 | Shi | 395/200.53 |
| 5,416,905 | 5/1995 | Mori et al. | 395/200 |
| 5,423,034 | 6/1995 | Cohen-Levy et al. | 395/600 |
| 5,463,735 | 10/1995 | Pascucci et al. | 395/200.1 |
| 5,572,438 | 11/1996 | Ehlers et al. | 364/492 |
| 5,655,081 | 8/1997 | Bonnell et al. | 395/200.32 |
| 5,706,501 | 1/1998 | Horikiri et al. | 395/610 |

FOREIGN PATENT DOCUMENTS 3-235125  10/1991  Japan ............................ G06F 9/445

OTHER PUBLICATIONS

Mamram, "Maintenance of System Software on a Wide Area Network of Mainframes", IEEE, 1991, pp. 113–119.

Pau et al., "SOFTM: A Software Maintenance Expert System in Prolog", IEEE 1988 pp. 306–311.

Flavin et al, "Management of Distributed Applications in Large Networks", IEEE 1988, pp. 232–241.

"Challenge! Personal Computer LAN", Nikkei Byte, Oct. 1991.

"Client API for C" Novell, Inc by 1993.

*Primary Examiner*—Meng-Ai T. An
*Assistant Examiner*—Dzung Nguyen
*Attorney, Agent, or Firm*—Antonelli, Terry, Stout & Kraus, LLP

[57] ABSTRACT

A network operating information setting system includes a design device, an automatic setting device and a network device. The design device has the function of producing a command chain of information which an operator designs using a GUI (Graphical User Interface) in order to store the command chain thus produced in a storage medium such as a floppy disk. In addition, the design device also has the function of reading out data from the storage medium in order to display the data thus read out. The automatic setting device has the function of reading out the command chain from the storage medium in order to transmit the command chain thus read out to the network device through a data transmission line. In this connection, an inverse command chain may be produced which is used to restore the network operating information to the original information in the network device. In addition, the automatic setting device has both the function of reading out data from the network device and the function of producing production commands for the data thus read out from the data.

14 Claims, 7 Drawing Sheets

NETWORK OPERATING INFORMATION SYSTEM HAVING DESIGN DEVICE AND AUTOMATIC SETTING DEVICE

CROSS-REFERENCE TO RELATED APPLICATION

This application relates to U.S. patent application Ser. No. 08/046942 filed on Apr. 16, 1993, and assigned to the patent assignee. The content of that application is incorporated herein by reference.

BACKGROUND OF THE INVENTION

1. Field of the Invention

The present invention relates in general to a technology for supporting the construction/operation of a network, and more particularly to a technology for carrying out the support in such a way that the setting/change of management information and the like, which a network system has, can be readily carried out.

2. Description of the Related Art

In order to construct a computer system in which a plurality of information devices connected to one another are used, in addition to installation of hardware devices and connection between the devices, the environment setting work for the network system is required. As for the setting items of this environment setting work, for example, kinds of hardwares to be used, and network addresses or the like are given.

That environment setting work is difficult to be carried out because the following two problems associated therewith arise.

(1) The expert knowledge is required for the setting work. For this reason, for example, an engineer who has a duty of constructing the network system needs to go to the construction field in order to construct the network system.

(2) Even when setting the same information to a plurality of setting objects, the same input work needs to be repeatedly carried out and hence the work is necessarily complicated.

As for a method of solving the above-mentioned problems, there is given the technology disclosed in Related Application. This technology is achieved by provision of an information setting device for setting information (parameters) of kinds of apparatuses to be connected to a network, a connection form of the network and the like which are required when constructing the network, an information processor including a file producing unit for storing that information in a file, and a network constructing unit for activating automatically a network operating system by referring to the file.

By adopting this structure, the work for constructing a network can be divided into an information design work for inputting the information which is required when constructing the network in order to store the information thus inputted in a file, and a construction work for constructing automatically the network by referring to the file thus produced.

If the above-mentioned technology is utilized, since the construction work is automatically carried out, if an engineer who has a duty of constructing the network system as shown in the example of the above-mentioned problem (1) has only to design information which will be set to the network system in a company in which the engineer is engaged and also to send the file to the field, the construction work can be left to a person or person in the field, and hence the engineer does not need to take the trouble to go to the field.

In addition, once the information is designed, it will be stored in the file. Therefore, if the file is repeatedly reutilized, then this will result in the same information not being required to be repeatedly inputted. As a result, the above-mentioned problem (2) can also be solved.

SUMMARY OF THE INVENTION

According to the conventional technology as described above, the information itself which is required when constructing the network is stored in the file, whereby the construction of the network device is automated. In this method, however, setting newly the information or the overwrite setting is possible, but the information updating operation such as partial deletion or change of the information which is already set can not be carried out.

In the light of the foregoing problems associated with the prior art, it is an object of the present invention to provide a network operating information setting system which is capable of carrying out the operation of setting newly information and the operation of updating information efficiently and flexibly.

In order to attain the above-mentioned object, in the present invention, both a design device and an automatic setting device are employed.

The design device has the function of producing a command chain from information which an operator designs using a GUI (Graphical User Interface) in order to store the command chain in a storage medium such as a floppy disk or the like. In addition, the design device has the function of reading out data from the storage medium in order to display the data thus read out.

On the other hand, the automatic setting device has the function of reading out the command chain from the storage medium in order to transmit the command chain thus read out to a network device through a data transmission line. In this connection, the automatic setting device may produce an inverse command chain which is used to restore the network operating information in the network device to the original information before change. In addition, the automatic setting device has both the function of reading out the network operating information from the network device and the function of producing, from that information, a production command for that information.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

(1) System Structure

Figure 1:
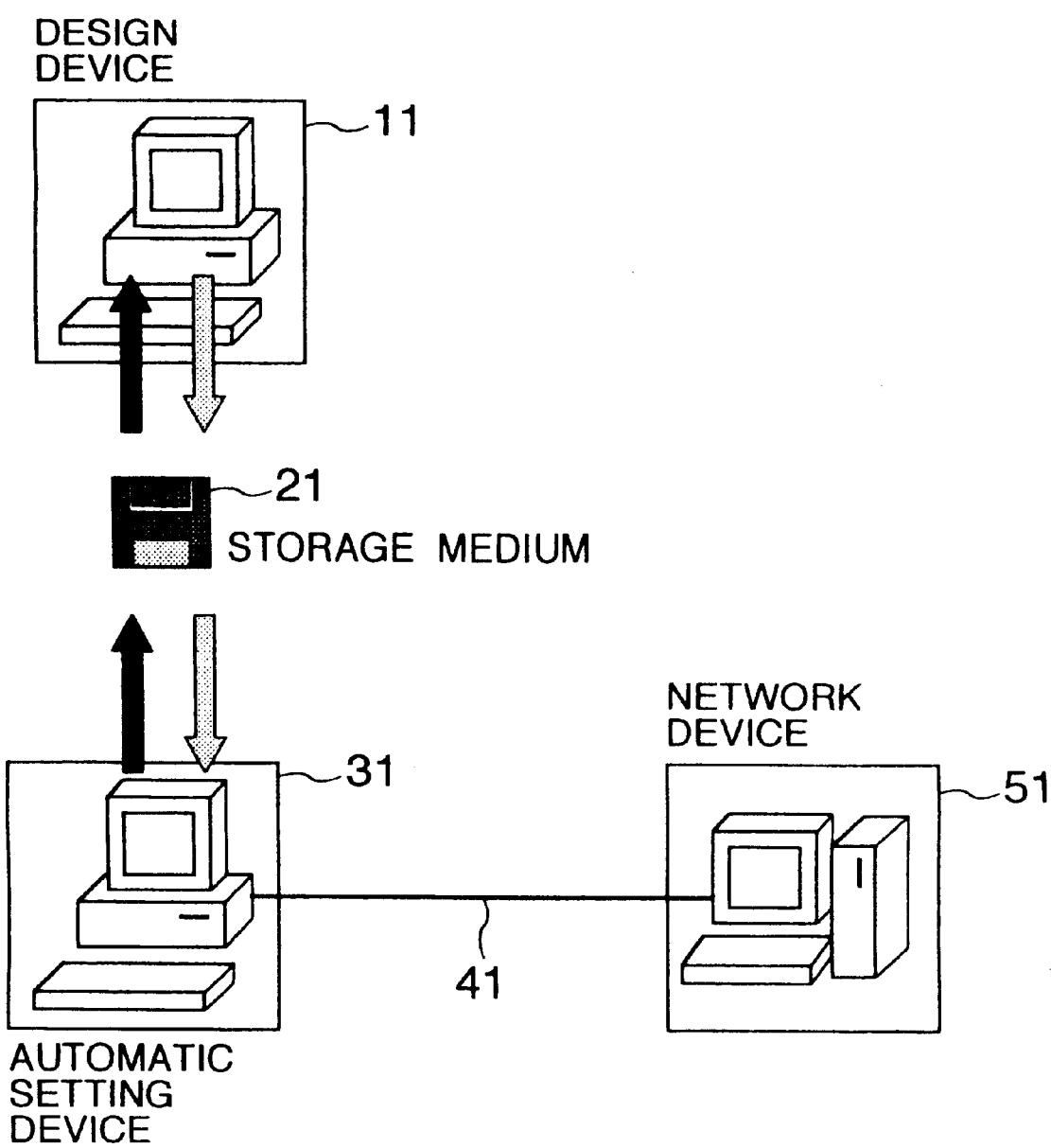
FIG. 1 is a schematic view showing a structure of a network operating information setting system according to the present invention.

Referring first to FIG. 1, there is shown an example of a system structure of the present invention. A design device 11 serves to edit information which is to be set to a network device 51 in accordance with a command issued from an operator and also to store data, which is obtained by converting that information into command chain, in a storage medium 21. Conversely, a command chain may be read out from the storage medium 21. The storage medium 21 stores therein the command chain which is to be set to the network device 51. An automatic setting device 31 fetches the command chain stored in the storage medium 21 in order to set the command chain thus fetched to the network device 51. In addition, the automatic setting device 31 also has the function (information collection function) of fetching the information which the network device 51 holds in order to convert the information thus fetched into desired command chain to store the resultant command chain in the storage medium 21. The automatic setting device 31 is connected to the network device 51 through a data transmission line 41.

Each of the design device 11 and the automatic setting device 31 is comprised of a personal computer or a work station, and includes a CPU (central processing unit), a main memory, an input unit such as a keyboard or mouse, a display device, a storage unit such as a disk, and an I/O interface unit for the storage medium 21. In addition, the automatic setting device 31 also includes an interface unit for the data transmission line 41. The data transmission line 41 is a private line, a telephone line or the like. The network device 51 is a device which holds information of users and devices connected to the network, and is a server for example.

(2) Network Operating Information

Network operating information is information which is stored in the network device 51. The network operating information contains the parameters such as kinds of devices connected to the network, connection forms and addresses thereof, and the user information such as identifiers, passwords and authorization of network users. The information of users can be hierarchized. For example, "Both a user information A and a user information B belong to a section information X".

In many cases, the network device 51 provides interface commands which are used to set the network operating information. For example, Netware made by Novell, Inc. is well known as the interface commands.

When constructing the network, an operator needs to input a large amount of interface commands similar to one another to the network device 51 in order to set thereto the network operating information. However, as will be described later, the provision of the design device 11, the storage medium 21 and the automatic setting device 31 makes the operation of inputting the network operating information easy, and also to make the reutilization of information once inputted and the backup of the input information possible.

(3) Configuration of Design Device

The design device 11 includes a graphical user interface (GUI) so that an operator can input the information, which is used to produce and change the network operating information, using the graphic screen or the menu screen. In addition, a prototype is provided for each network operating information in accordance with a type of the network operating information to be produced so that an operator changes a default value, which is previously set to each attribute of that prototype, using an input unit such as a keyboard or a mouse, thereby being able to design the network operating information. In this connection, each network operating information is called an object.

In addition, the design device 11 includes a command producing program which is used to produce a command chain for producing/changing an object from the information which has been inputted through the GUI so as to store the resultant command chain in the storage medium 21.

Figure 2:
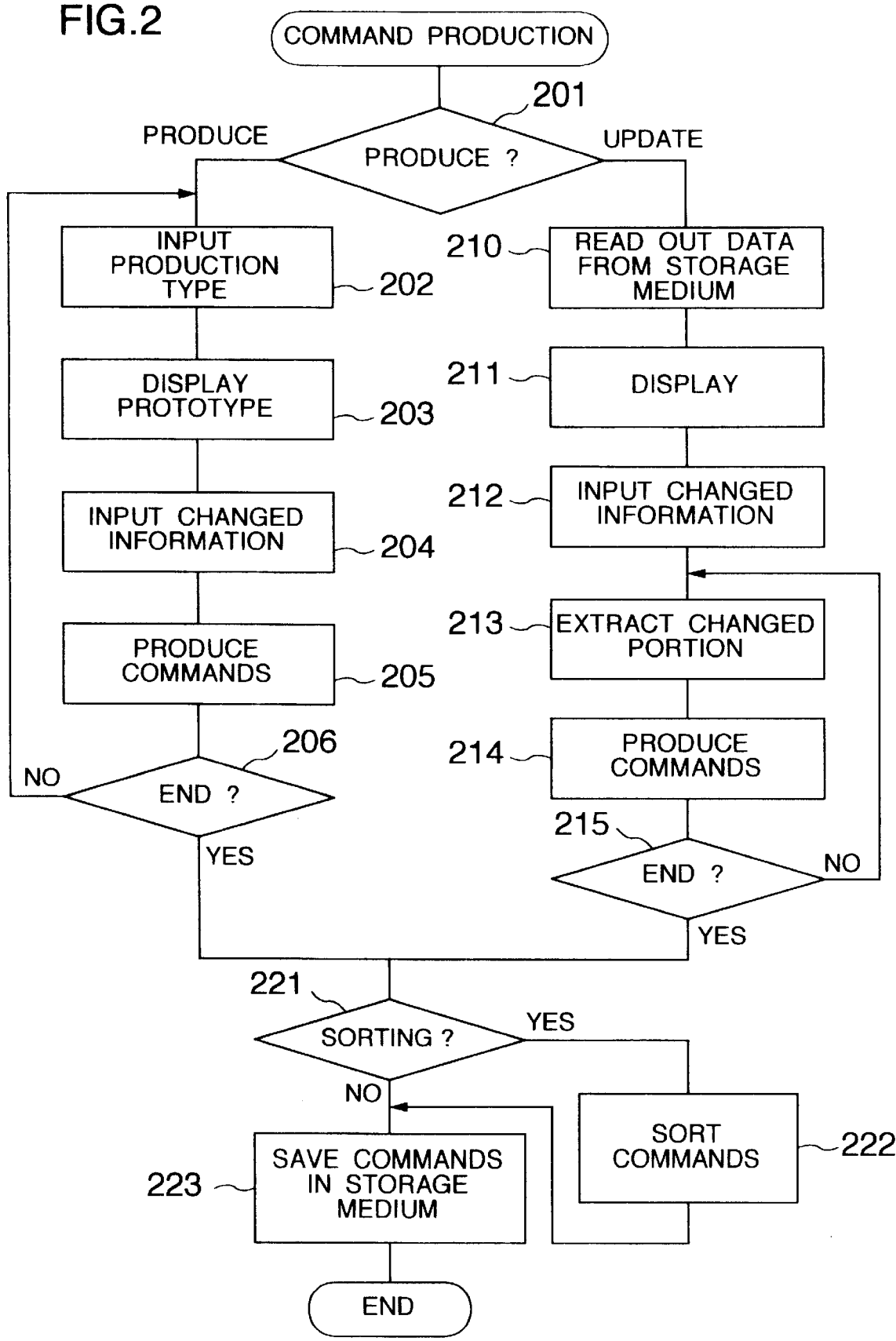
FIG. 2 is a flow chart of a command producing program which is executed by a design device.

Referring to FIG. 2, there is illustrated a flow chart showing the command producing program.

Firstly, it is judged whether a user commands the program to produce or update an object (Step 201). If the user commands the program to produce the object, then the type and the hierarchical relationship of the object are inputted by the user (Step 202). The program displays a predetermined prototype on the screen from the inputted object type so as to urge the user to change the prototype (Steps 203 and 204). The user changes the prototype, whereby an attribute value of a new object is set and then the data relating to an image of the new object is stored in the memory. Then, the program produces a command chain from the object image on the memory (Step 205). The command chain which is produced in the processing of Step 205 may be either the same as interface commands which the network device provides or similar thereto. In this connection, while the command of the above-mentioned Netware (made by Novell, Inc.) includes parameters which are used in only the server, a command chain in which such parameters are omitted may be produced. An example of production of the command chain will hereinbelow be given.

The commands corresponding to the following functions are produced in order to produce one object A having two attributes.

① Define an attribute name 1.
② Set an attribute value 1.
③ Add the object A.
④ Define an attribute name 2.
⑤ Set an attribute value 2.
⑥ Add the attribute 2 to the object A.

If there are three or more attributes, then the commands ④ to ⑥ will be repeatedly produced. In addition, the above-mentioned hierarchical relationship is reflected in the object name. If the object A belongs to an object X, then the name of the object A will be "A.X".

The processings of Steps 202 to 205 are repeatedly executed for all the objects to be produced (Step 206).

If the program is commanded to update the object by an user, then the program reads out the data relating to the state of the current object from the storage medium 21 (Step 210) in order to display the current object on the screen (Step 211). Then, an operator commands the program to add a new object, delete the existing object or change the attribute of the existing object (i.e., update the object) for the current object displayed on the screen, and the program fetches in the changed contents (Steps 212 and 213).

Next, the program produces a command chain corresponding to all the changed contents (Steps 214 and 215).

For addition of a new object, the program produces a command chain as described above.

For deletion of the existing object A, the program produces the following command.

① Delete the object A.

For the change of the attribute 1 of the existing object A, the program produces the following command chain.

① Specify the attribute name 1 and the changed content (addition, deletion or change).

② Specify the attribute value 1 (in the case of deletion, the attribute value to be deleted is specified).

③ Change the object A.

In the case of addition of a new object as well as in the case of update, the program saves the produced command chain in the storage medium 21.

At this time, if the operator indicates, the produced command chain may be sorted in correspondence to the individual operations of producing, deleting and changing the object (Steps 221 and 222).

While the program saves the command chain or the sorted command chain in the storage medium 21, at this time, the compaction of the command text may be carried out (Step 223).

That program is executed by the CPU of the design device 11.

While the prototype corresponding to the object type is supplied in the present embodiment, all the attributes may be set by the operator.

In addition, the produced command chain is also saved in a file in the disk. The design device 11 reads out the desired data from that file again, and then that file may be reutilized by applying change thereto using an editor or the like.

(4) Configuration of Automatic Setting Device

The automatic setting device 31 has the following two software programs: One is an information setting program which serves to read out a command chain from the storage medium 21 in order to convert the command chain thus read out into interface commands for the network device 51, and to transmit the resultant interface commands to the network device 51 through the data transmission line 41. The other is an information collection program which serves to transmit the interface commands to the network device 51 through the data transmission line 41 in order to read out information in the network device 51.

Each of the programs is activated in response to the command input from an operator. In addition, these programs are executed by the CPU in the automatic setting device 31.

Figure 3:
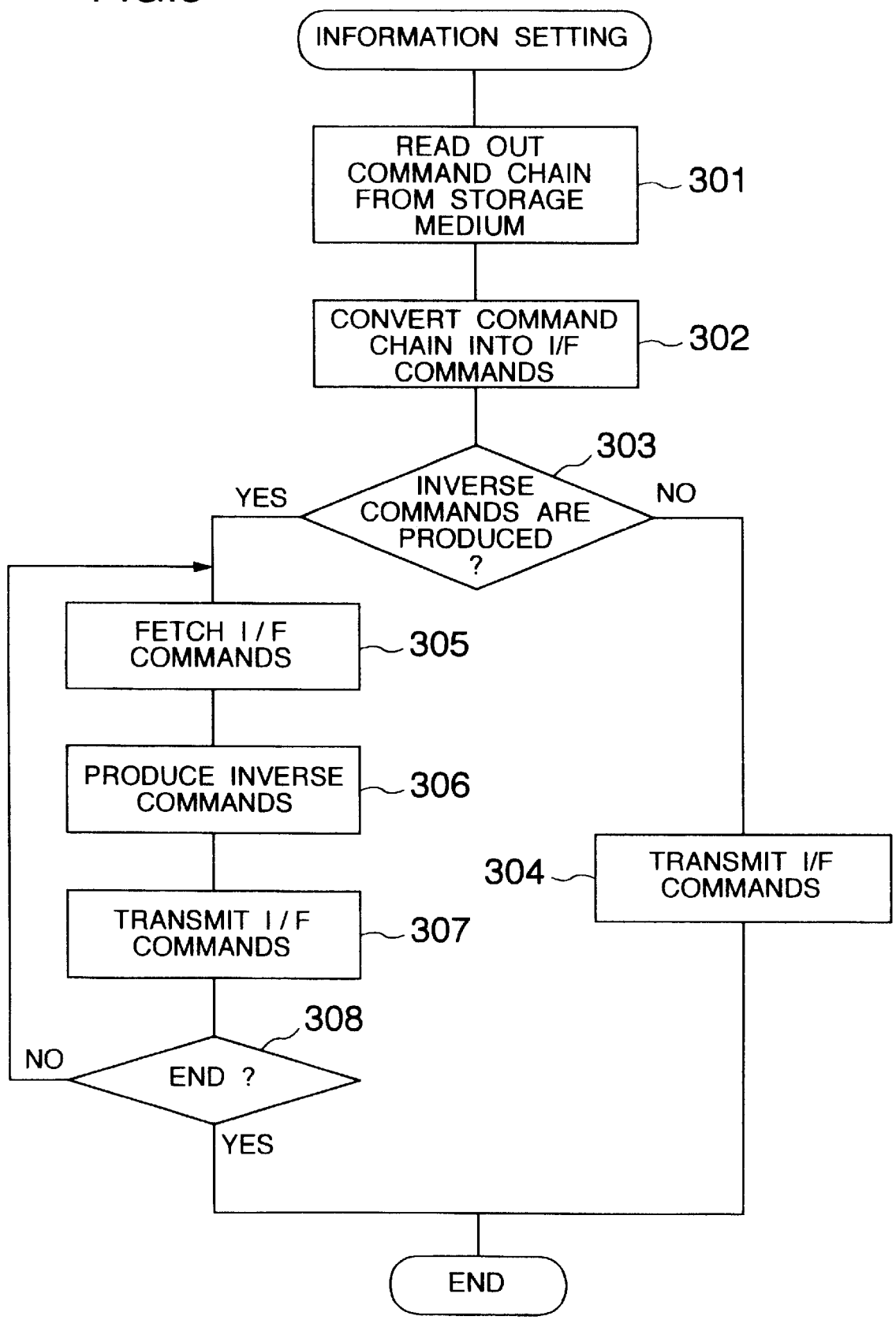
FIG. 3 is a flow chart of an information setting program which is executed by an automatic setting device.

Referring now to FIG. 3, there is illustrated a flow chart of the information setting program.

Firstly, this program reads out a command chain stored in the storage medium 21 (Step 301). The command chain is previously produced by the design device 11 and then is stored in the storage medium 21. Now, when the command chain is compacted in order to be stored in the storage medium 21, the command chain is expanded when being read out from the storage medium 21.

Next, the command chain is converted into interface commands of the network device 51 (Step 302). This processing depends on how different the command chain is from the interface commands. If the command chain is identical to the interface commands, then this processing is not required at all. If not, the conversion of the command names, the addition of parameter or parameters, the addition of the related command or commands, and the like are carried out. In addition, the processing which will be executed when an error occurs may be added.

Now, when the change and addition of the network operating information are carried out, the network does not operate normally in some cases. In such cases, it is necessary to restore the network operating information in the network device to the original information before the change thereof. The program of interest has the function of transmitting the interface commands to the network device 51 and also of producing interface commands (inverse commands) which are used to restore the network operating information in the network device 51 to the original information.

The program of interest checks whether or not the production of the inverse commands is indicated by an operator (Step 303).

If the production of the inverse commands is not indicated by the operator then the program transmits the interface commands to the network device 51 through the data transmission line 41 (Step 304).

If the production of the inverse commands is indicated by the operator, then the program executes the following processings.

That is, the program fetches the interface commands relating to the operation of one object (Step 305), and then produces the inverse commands for the one object (Step 306). Thereafter, the program transmits the interface commands to the network device 51 (Step 307). These processings from Step 305 to Step 307 are repeatedly executed for all the objects (Step 308).

Next, a method of producing the inverse commands in the processing of Step 306 will hereinbelow be described in detail.

(A) In the case that the fetched commands correspond to new production of the object A.
  ① Make interface commands to delete the object A.
(B) In the case that the fetched commands correspond to deletion of the object A.
  ① Make interface commands to read all the attribute names and all the attribute values of the object A.
  ② Transmit the interface commands which have been produced in ① to the network device 51 through the data transmission line 41 in order to read out the desired data from the network device 51, and then receives the data thus read out through the data transmission line 41.
  ③ From the data thus read out, make the interface commands (inverse commands) to define the names of the attributes, set the attribute values, and add the object A.
(C) In the case that the fetched commands correspond to change of the object A.
  ① In the case where the attribute or attributes are deleted or changed in the fetched commands, make interface commands to read out related attribute value or attribute values.
  ② Transmits the interface commands which have been produced in ① to the network device 51 through the data transmission line 41 in order to read out the desired data from the network device 51, and then receives the data thus read out through the data transmission line 41.
  ③ Make interface commands (inverse commands) to define the attribute names, set the attribute values and change the object A. Now, in the case where the attribute or attributes are deleted or changed in the fetched commands, make the inverse commands for specifying attribute name(s) and attribute value(s) using the attribute value(s) which have been read out from the network device 51. In the case of addition of the attribute or attributes, make the inverse commands for deleting the attribute using the attribute name(s) of the fetched interface commands.

Both the interface commands which are produced in the processing of Step 302 and the inverse commands which are produced in the processing of Step 306 are stored in a memory such as a hard disk provided in the automatic setting device 31.

Both the transmission of the interface commands and the reception of the results are carried out in accordance with a kind of data transmission line 41 and the protocol for use therein.

Figure 4:
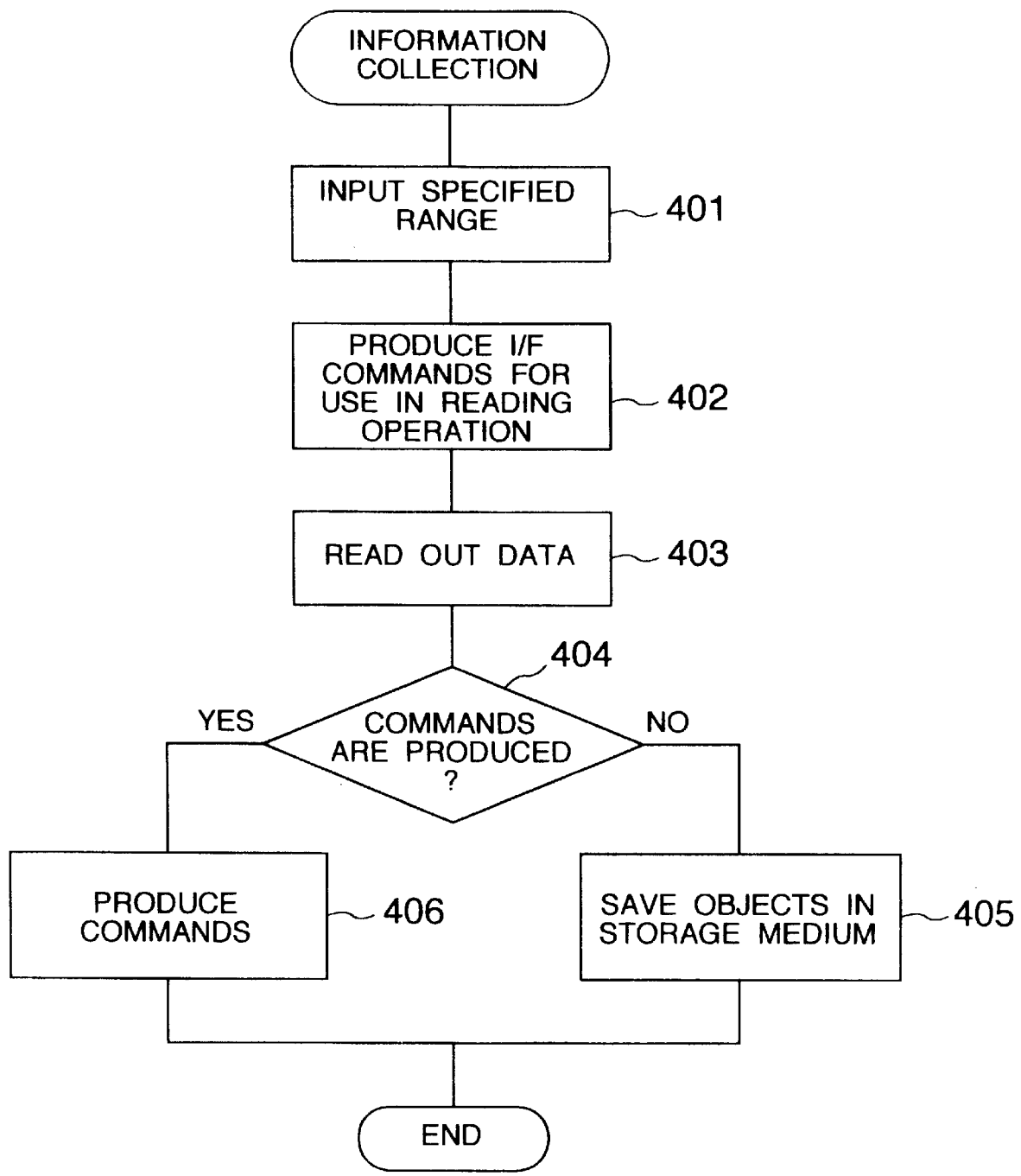
FIG. 4 is a flow chart of an information collection program which is executed by the automatic setting device.

Referring now to FIG. 4, there is illustrated a flow chart of the information collection program.

Firstly, an operator specifies the range of the network operating information, within the network device 51, which should be collected and then the program inputs the specified contents (Step 401). This specification may be carried out either through the menu screen or on the basis of the command. The range is, for example, specified in the form of "all", "all lower rank objects belonging to the object A" or "only the object A".

Next, the program produces the interface commands by which the object or objects within the specified range are read out from the network device 51 (Step 402).

Then, the program transmits the interface commands which have been produced in the processing of Step 402 to the network device 51 in order to read out the desired object or objects therefrom (Step 403).

The object or objects which have been read out in the processing of Step 403 are processed by the following two methods on the basis of the indication issued from an operator. One is a method wherein the object or objects are directly saved in the storage medium 21 (Step 405). In this connection, the data thus saved is used in the processing of updating the object or objects in the above-mentioned design device 11 (refer to Step 210 of FIG. 2). The object or objects thus read out are stored in the storage medium in the format which is determined between the design device 11 and the automatic setting device 31.

The other is a method wherein the read object or objects which have been read out are converted into the interface commands by which the object or objects of interest are produced (Step 406). In the case where the network operating information of the network device 51 is lossed due to an accident or the like, such interface commands can be used to reconstruct the network operating information of interest. The interface commands which have been obtained by the conversion contains the procedure of defining all the attribute names and all the attribute values and adding the object, which procedure uses the read out data, with respect to the respective objects. The commands may be stored in the disk storage or the storage medium.

(5) Examples of Operation of System

While the operations of the individual devices constituting the system have been described in the above-mentioned sections (3) and (4), in this section, the operation of the overall system is described by giving examples.

(a) Setting of New Information

Figure 5:
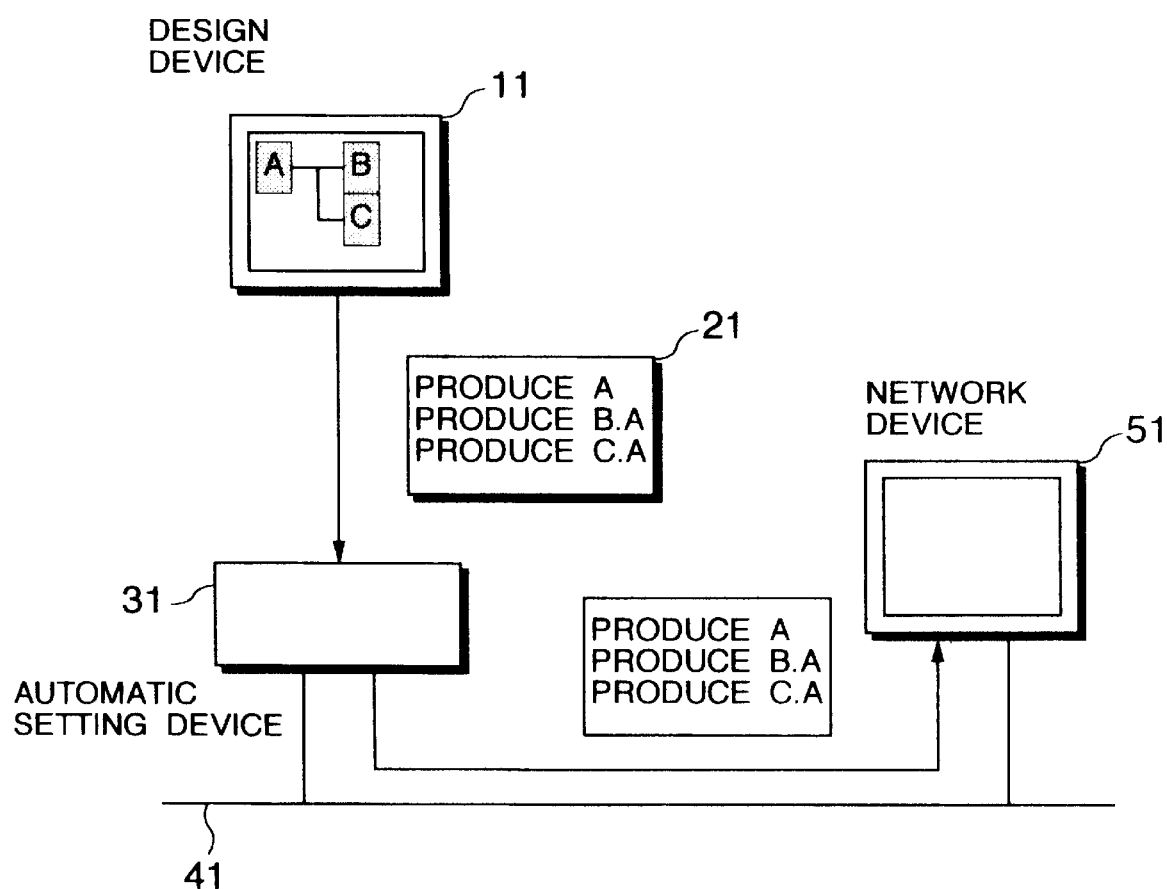
FIG. 5 is a block diagram useful in explaining an example of the procedure of designing and setting information in the system.

Referring now to FIG. 5, there is shown the procedure of setting newly the objects to the network device 51.

After an operator has edited a tree structure consisting of objects A, B and C on the design device 11, the design device 11 produces a command chain corresponding to "produce A", "produce B.A" and "produce C.A" so as to store the command chain thus produced in the storage medium 21. Then, the automatic setting device 31 reads out the command chain from the storage medium 21 in order to convert the command chain thus read out into the interface commands to transmit the interface commands to the network device 51 through the data transmission line 41.

Figure 6:
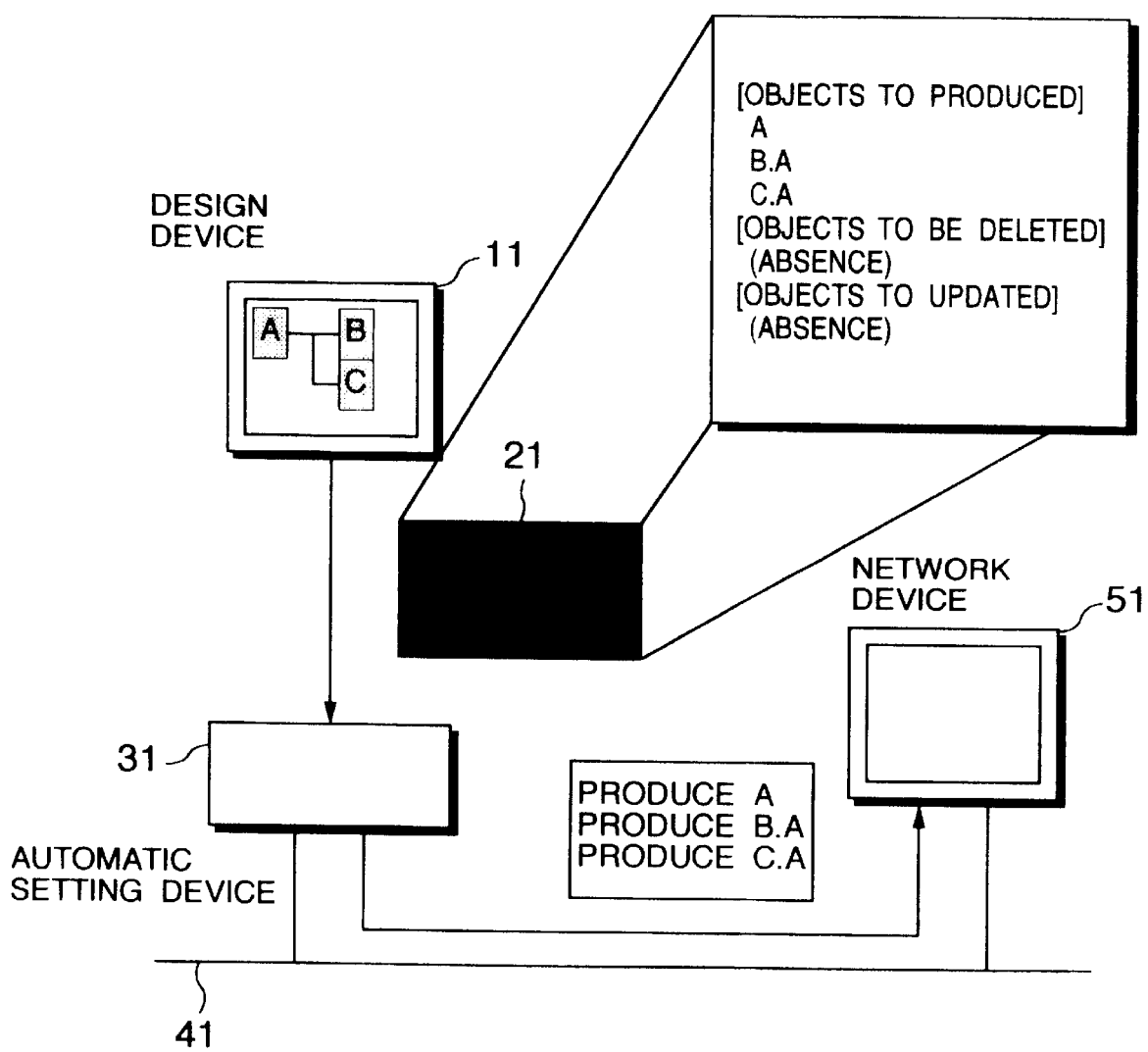
FIG. 6 is a block diagram, partly in a schematic view, useful in explaining another example of the procedure of designing and setting information in the system.

Referring to FIG. 6, there is shown another procedure of setting newly the objects to the network device 51. As apparent from FIG. 6, while the procedure shown in FIG. 6 is substantially the same as that shown in FIG. 5, this procedure is characterized in that after the command chain which was once produced by the design device 11 has been sorted, it is stored in the storage medium 21.

(b) Setting of Updated Information

Figure 7:
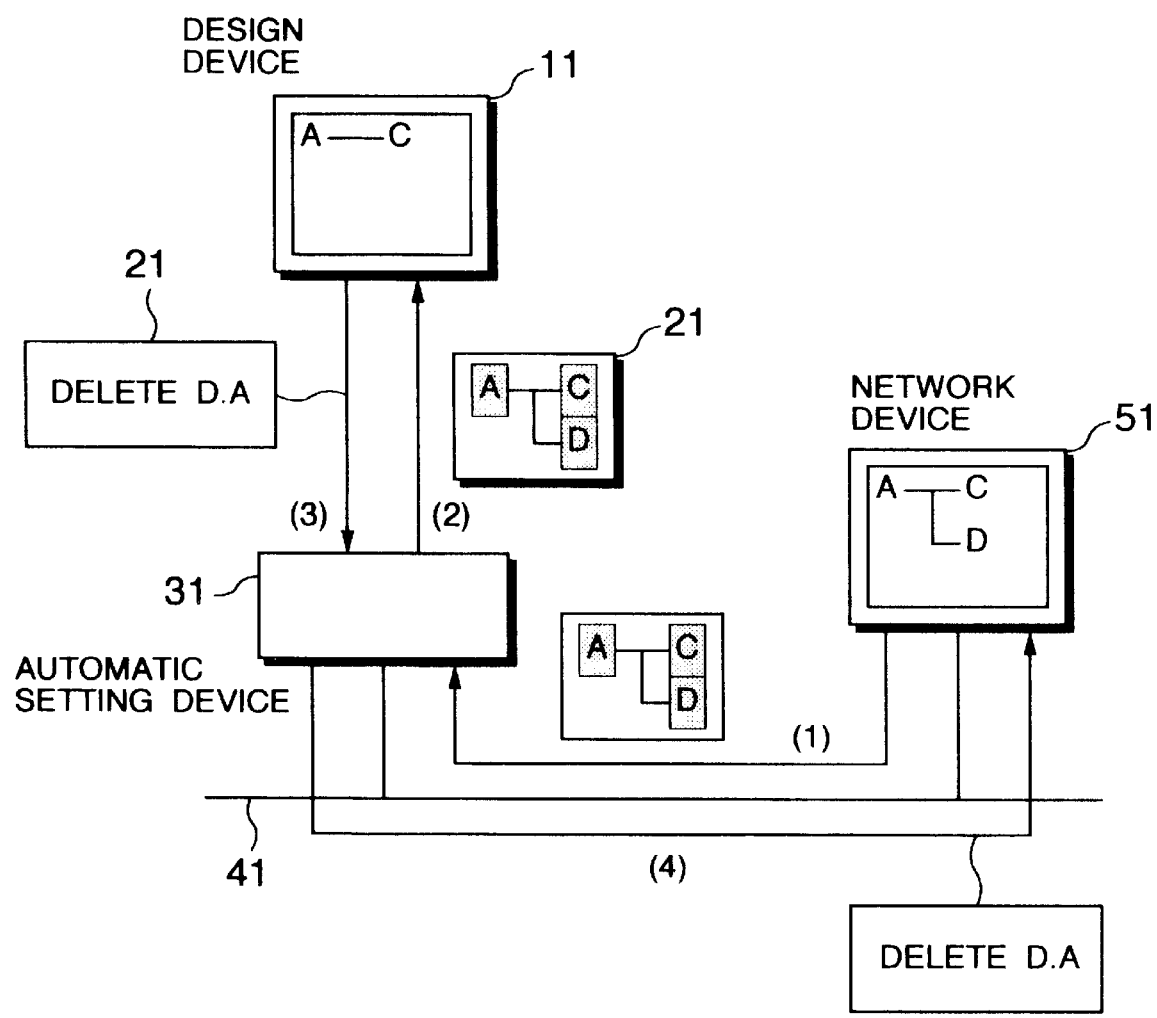
FIG. 7 is a block diagram, partly in a schematic view, useful in explaining still another example the procedure of updating information in the system.

Referring to FIG. 7, there is shown the procedure of updating the information which is already set to the network device 51.

Firstly, an operator inputs the commands through the automatic setting device 31 in order to read out the object relating to the object A from the network device 51 (indicated by an arrow 1). This information thus read out is saved in the storage medium 21 and the delivered to the design device 11 (indicated by an arrow 2). A user modifies the current information using the design device 11 and then the design device 11 converts the modified portion thereof into commands. The resultant commands are stored in the storage medium 21 (indicated by an arrow 3). Then, the automatic setting device 31 reads out these commands in order to transmit these commands to the network device (indicated by an arrow 4).

(6) Modifications

The examples which have been described above may be changed as follows.

That is, the command producing program (refer to FIG. 2) which is executed by the design device 11 may be divided into an information newly producing program and an information updating program. In this connection, these programs may be activated by different commands, respectively. In addition, the processing of reading out/writing data from/to the storage medium 21 may be executed by another program.

The information setting program (refer to FIG. 3) which is executed by the automatic setting device 31 transmits the commands to the network device 51 and also produces the inverse commands (refer to Step 306 of FIG. 3). Now, in the case where errors occur in the network device 51, the information setting program may transmit the inverse commands which are already produced until that time to the network device 51 in order to restore automatically the data to its former state.

The function of comparing the old data with the new data so as to produce the commands only with respect to the changed portion thereof (refer to Steps 213 and 214 of FIG. 2) may be transferred from the design device 11 to the automatic setting device 31. In this case, an operator carries out the object design using the design device 11 in the same manner as that when producing newly the information. Then, the automatic setting device 31 compares the data which has been designed by an operator with the data which has been read out from the network device 51, and then produces the necessary interface commands.

In addition, both the design device 11 and the automatic setting device 31 may be realized by one device. In this case, an internal file may be employed instead of the storage medium 21.

What is claimed is:

1. A network operating information setting system for setting network operating information, which is required for operating a network, to a network device for managing the network operating information in a computer network having a plurality of communication apparatuses connected thereto, said system comprising:

design means for designing the network operating information which is to be set to said network device, said design means including input means for inputting therethrough to information for use in design by an operator, conversion means for converting the information inputted by the user into the editing operation procedure of producing, deleting or changing the network operating information, and storage means for storing data relating to the editing operation procedure; and automatic setting means, connected to said network device through a data transmission line and installed in a separate apparatus than the design means, for reading out the data relating to the editing operation procedure from said storage means of said design means in order to carry out a network operating information operation for said network device.

2. A network operating information setting system according to claim 1, wherein said storage means is comprised of a portable storage medium removable from said storage means.

3. A network operating information setting system according to claim 1, wherein said automatic setting means further includes:

information collection means for reading out the network operating information from said network device, and operation reproducing means for producing an operation procedure of reproducing the network operating information thus read out from the network operating information.

4. A network operating information setting system according to claim 1, wherein said automatic setting means includes inverse operation producing means for producing, when carrying out the network operating information operation for said network device, an operation procedure of restoring the network operating information to its former state before carrying out the network operating information operation.

5. A network operating information setting system according to claim 1, wherein said input means included in said design means employs a graphical user interface.

6. A network operating information setting system according to claim 3, wherein said input means included in said design means displays the network operating information read out by said information collection means of said automatic setting means, thereby enabling the network operating information to be changed by a user, and said conversion means converts only the changed portion of the network operating information into the editing operation procedure.

7. A network operating information setting system according to claim 1, wherein said design means includes reading means for reading out the data relating to the editing operation procedure stored in said storage means in order to reedit said editing operation procedure.

8. A network operating information setting method of setting network operating information, which is required for operating a network, to a network device for managing the network operating information in a computer network having a plurality of communication apparatuses connected thereto, said method comprising the steps of:

inputting design information for use in design of the network operating information, which is to be set to said network device, in accordance with a command issued from an operator;

converting the design information which has been inputted into the editing operation procedure of producing, deleting or changing the network operating information;

storing the data relating to the editing operation procedure in a storage medium; and reading out the data relating to the editing operation procedure from said storage medium in order to carry out automatically a network operating information operation for said network device.

9. A network operating information setting method according to claim 8, further comprising the step of reading out the current network operating information from said network device in order to display said current network operating information.

10. A network operating information setting method according to claim 8, wherein the inputting, converting and storing steps are performed in a design device and the reading step is performed in a setting device connected to the network device.

11. A network operating information setting method according to claim 10, comprising the step of reading out the current network operating information from said network device in order to display said current network operating information.

12. A network operating information setting system according to claim 2, wherein said design means is separate from said computer network.

13. A network operating information setting system according to claim 12, wherein said automatic setting means further includes:

information collection means for reading out the network operating information from said network device, and operation reproducing means for producing an operation procedure of reproducing the network operating information thus read out from the network operating information.

14. A program storage device, readable by a machine, for tangibly embodying a program of instructions executable by the machine to carry out a method of setting network operating information to a network device for managing the network operating information, said method comprising the steps of:

inputting design information for use in design of the network operating information, which is to be set to said network device, in accordance with a command issued from an operator;

converting the design information which has been inputted into the editing operation procedure of producing, deleting or changing the network operating information;

storing the data relating to the editing operation procedure in a storage medium; and reading out the data relating to the editing operation procedure from said storage medium in order to carry out automatically a network operating information operation for said network device.

* * * * *